(12) United States Patent
Shmulevich et al.

(10) Patent No.: US 8,156,141 B1
(45) Date of Patent: Apr. 10, 2012

(54) INCORPORATED WEB PAGE CONTENT

(75) Inventors: Igor Shmulevich, San Ramon, CA (US); Ling Chen, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 412 days.

(21) Appl. No.: 11/639,038

(22) Filed: Dec. 13, 2006

(51) Int. Cl.
*G06F 17/00* (2006.01)

(52) U.S. Cl. ......... 707/770; 707/769; 707/803; 709/227

(58) Field of Classification Search ............. 707/999.01, 707/770, 803, 769; 709/227
See application file for complete search history.

(56) References Cited

U.S. PATENT DOCUMENTS

| | | | |
|---|---|---|---|
| 5,937,160 A * | 8/1999 | Davis et al. | 709/203 |
| 6,092,074 A | 7/2000 | Rodkin et al. | |
| 6,247,032 B1 | 6/2001 | Bernardo et al. | |
| 6,343,302 B1 | 1/2002 | Graham | |
| 6,557,013 B1 | 4/2003 | Ziff et al. | |
| 6,560,639 B1 | 5/2003 | Dan et al. | |
| 6,611,835 B1 * | 8/2003 | Huang et al. | 1/1 |
| 6,750,885 B1 | 6/2004 | Finch et al. | |
| 6,842,782 B1 | 1/2005 | Malik et al. | |
| 7,143,344 B2 | 11/2006 | Parker et al. | |
| 7,194,469 B1 | 3/2007 | Dowd et al. | |
| 7,237,002 B1 | 6/2007 | Estrada et al. | |
| 7,316,003 B1 | 1/2008 | Dulepet et al. | |
| 7,401,083 B2 | 7/2008 | Daemke et al. | |
| 2002/0046244 A1 | 4/2002 | Bimson et al. | |
| 2002/0046245 A1 | 4/2002 | Hillar et al. | |
| 2002/0091725 A1 | 7/2002 | Skok | |
| 2002/0140730 A1 | 10/2002 | Linsey et al. | |
| 2002/0184255 A1 | 12/2002 | Edd et al. | |
| 2003/0023632 A1 | 1/2003 | Ries et al. | |
| 2003/0028801 A1 | 2/2003 | Liberman et al. | |
| 2003/0074634 A1 | 4/2003 | Emmelmann | |
| 2003/0101255 A1 | 5/2003 | Green | |
| 2003/0163519 A1 | 8/2003 | Kegel et al. | |
| 2003/0196171 A1 | 10/2003 | Distefano, III | |
| 2003/0204811 A1 | 10/2003 | Dam et al. | |
| 2004/0006747 A1 | 1/2004 | Tyler | |
| 2004/0019634 A1 | 1/2004 | Van Geldern et al. | |
| 2004/0148318 A1 | 7/2004 | Taylor et al. | |
| 2004/0148576 A1 | 7/2004 | Matveyenko et al. | |
| 2004/0205529 A1 | 10/2004 | Poulose et al. | |
| 2004/0205659 A1 | 10/2004 | Barry et al. | |
| 2004/0215719 A1 | 10/2004 | Altshuler | |
| 2004/0217985 A9 | 11/2004 | Ries et al. | |
| 2004/0225658 A1 | 11/2004 | Horber | |
| 2005/0050462 A1 | 3/2005 | Whittle et al. | |
| 2005/0108418 A1 * | 5/2005 | Bedi et al. | 709/232 |
| 2005/0171947 A1 * | 8/2005 | Gautestad | 707/5 |

(Continued)

OTHER PUBLICATIONS

Red Dot: "web content management": http://www.reddot.com/products_web_content management_smartedit.htm.

(Continued)

*Primary Examiner* — Belix M Ortiz (74) *Attorney, Agent, or Firm* — Van Pelt, Yi & James LLP (57) ABSTRACT

Keeping incorporated web page content up to date is disclosed. A web page is associated with a stored object that has been incorporated into the web page, for example an object stored in a repository. The web page is updated automatically based at least in part on an indication that the stored object has been changed.

12 Claims, 8 Drawing Sheets

U.S. PATENT DOCUMENTS

| | | | |
|---|---|---|---|
| 2005/0229101 A1 | 10/2005 | Matveyenko et al. | |
| 2005/0246627 A1 | 11/2005 | Sayed | |
| 2005/0262427 A1 | 11/2005 | Cantwell et al. | |
| 2006/0235984 A1 | 10/2006 | Kraus et al. | |
| 2007/0162845 A1 | 7/2007 | Cave et al. | |
| 2007/0208773 A1* | 9/2007 | Tsao | 707/103 R |
| 2007/0209005 A1 | 9/2007 | Shaver et al. | |
| 2007/0239726 A1* | 10/2007 | Weiss et al. | 707/10 |
| 2008/0010425 A1* | 1/2008 | Funk et al. | 711/163 |
| 2008/0040425 A1* | 2/2008 | Hines | 709/203 |
| 2008/0040661 A1 | 2/2008 | Curtis et al. | |

OTHER PUBLICATIONS

Interwoven: "Products".: http://www.interwoven.com/products/content_management/index.html.

Typo 3: "Feature List".: http://typo3.com/Feature_list.1243.0.html.

Tridion: "Content Creation". http://www.tridion.com/Products/R5/ContentCreation.asp.

Zip Zap: "Update and Build your Web Site Online via your Web Browser": http://www.zipzap.biz/webeditonline.html.

* cited by examiner

| ID | Location |
|----|----------|
| C  | http://... |

FIG. 8A

| ID | Location | Page | Page |
|----|----------|------|------|
| C  | http://... | B |  |
| B  | http://... | A |  |

FIG. 8B

INCORPORATED WEB PAGE CONTENT

BACKGROUND OF THE INVENTION

With web pages growing more sophisticated over the years, embedding objects such as URLs, images and video clips into web pages has become a common practice for web designers and content creators. It has been widely adopted by corporate websites and proven to be very effective for corporate websites for marketing, product introduction, and internal documentation purposes.

However, the traditional ways of providing a dynamic link to a stored object or pasting the object into a web page as a static content do not scale well with the size and complexity of modern corporate websites. The embedded objects are oftentimes maintained by other parties within the organization. Dynamically linking to an object from a web page, e.g., by including the in the web page a hypertext link to a URL associated with the stored object, may result in a "broken" link if the object is moved to a different storage location. On the other hand, pasting an object as static content may result in outdated content being included in a web page, e.g., if the included object as stored elsewhere is updated. Worse yet, an embedded may be moved and/or changes by a party unknown to the web designer. As a result, it takes significant overhead to fix broken links and/or update static content in a timely fashion, especially if a large number of web pages have to be maintained.

Therefore, an efficient way to update web pages when store objects included and/or linked to by them are moved and/or changed.

SUMMARY OF THE INVENTION

A technique of keeping incorporated web page content up to date is disclosed. The technique includes associating a web page with a stored object that has been incorporated into the web page. The web page is then automatically updated based at least in part on an indication that the stored object has been changed.

BRIEF DESCRIPTION OF THE DRAWINGS

The present invention will be readily understood by the following detailed description in conjunction with the accompanying drawings, and in which.

DETAILED DESCRIPTION

The invention can be implemented in numerous ways, including as a process, a system, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatically updating a web page in which stored content stored content has been incorporated is disclosed. In some embodiments, if a content object stored in a repository or other location is changed, a web page in which the object has been incorporated is updated automatically. In some embodiments, a table is maintained, for example in a repository or other location in which incorporated and/or linked objects are stored, in which stored objects that have been incorporated into web pages are tracked. In some embodiments, the table and/or a separate table includes an identification of the web pages into which a stored object has been incorporated. In the event the object is changed, the table is used to automatically update with the new object content the web page(s), if any, into which the object that has been changed is incorporated. In some embodiments, a web page that includes a stored object could in turn itself be embedded in another web page, and all the nested web pages are updated automatically if the object is changed. In some embodiments, a web page is saved in an intermediate format (e.g., XML) first with a link to the stored object, and the object is incorporated as a static content only when the web page is published. Changing the store object will force all the web pages including it either directly or indirectly to be republished. In some embodiments the software system is implemented as an online tool that could be launched and run within a browser.

Using a managed identifier to provide a link to a stored content object in a manner that does not require a linking web page to be updated if a physical storage location of the stored object is changed is disclosed. In some embodiments, the physical location of a stored object that is embedded in a web page or another web page whose URL is included in a designed web page is tracked and the physical location is associated with a managed identifier so the linkage is not broken when the physical location is moved. In some embodiments, a table is created and automatically updated in a repository (or other storage in which a stored object is stored) to map the managed identifier to a current physical location of a stored object within the repository (or other storage). In some embodiments, when the physical location of a stored object is changed, all web pages that include a link to the object are republished automatically. In some embodiments, web pages reference the managed identifier and are not required to be updated when the object is moved. Instead, only the table is updated. When a link is selected, the table is consulted to identify the current location of the stored object with which a managed identifier included in and/or otherwise associated with the link is associated.

Figure 1:
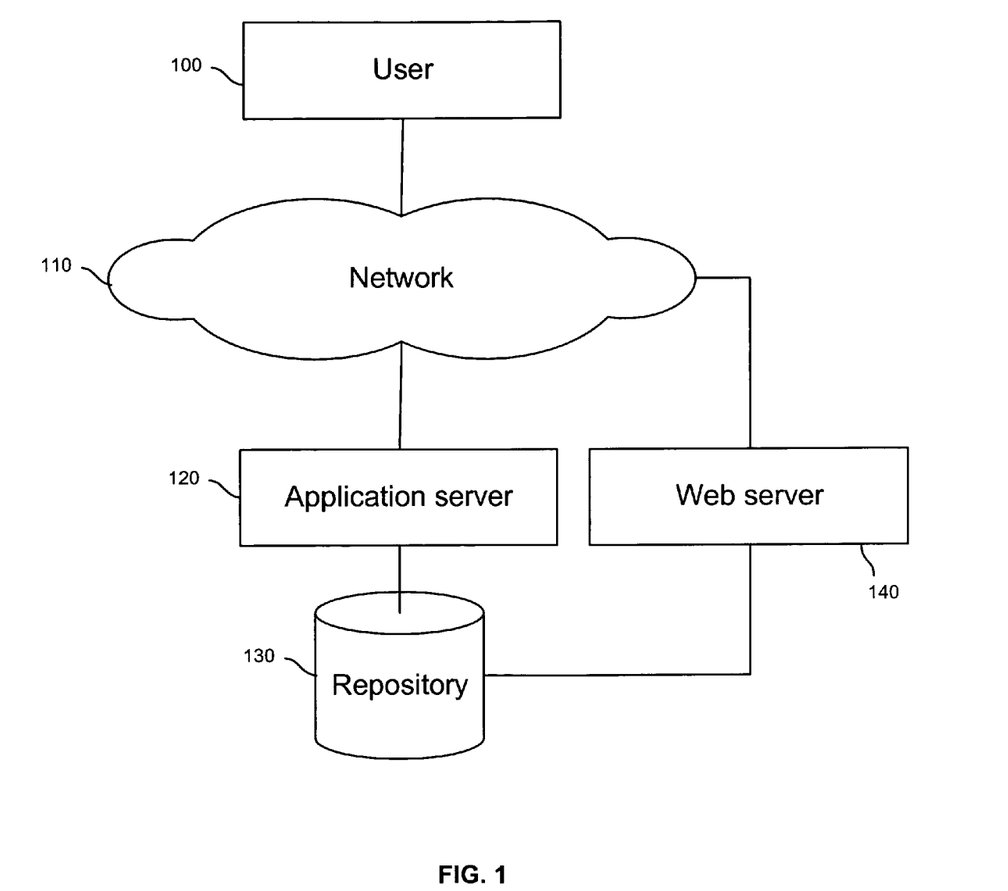
FIG. 1 shows an embodiment of a web page building application and associated storage and server elements.

FIG. 1 shows an embodiment of a web page building application and associated storage and server elements. In the example shown, a user 100 accesses via network 110 a web page building application running on an application server 120 to design a web page to be put on a web server 140. A repository 130 keeps tracks of all the stored objects (e.g., text, images, videos, audio clips, web pages, etc.) that have been incorporated into one or more web pages that have been and/or are intended to be published to web server 140. When the user wants to embed a stored object into a web page, the object is associated with the web page in a table or other data structure stored in repository 130 (or elsewhere). In some embodiments, when the web page into which the stored object has been incorporated is published (or republished), content comprising the stored object is incorporated into the web page as static content. If an object stored in repository 130 is changed, in some embodiments the table or other data structure is consulted to determine if the object has been incorporated in any other stored objects, such as one or more web pages. If so, any web pages are updated automatically, e.g., by republishing such web pages with the current content of the stored object incorporated as static content.

In some embodiments, a link to an object stored in repository 130 is included in a web page published to web server 140 by including in the web page a reference to a managed identifier associated with the stored object. Upon selection of such a link, e.g., by a user who has browsed to a web page in which the link is embedded, the managed link is used to determine a current location in repository 130 of the stored object, the object (e.g., a referenced web page) is retrieved, for example from repository 130 and/or web server 140, e.g., using a URL or other locator to which the managed identifier has been mapped, and returned to the user that selected the link. In some embodiments, the managed identifier remains the same even if the stored object is moved within repository 130 and/or on web server 140. As a result, even if numerous pages reference a stored object the location of the object only has to be update in one location, instead of in each occurrence in the numerous web pages.

Figure 2:
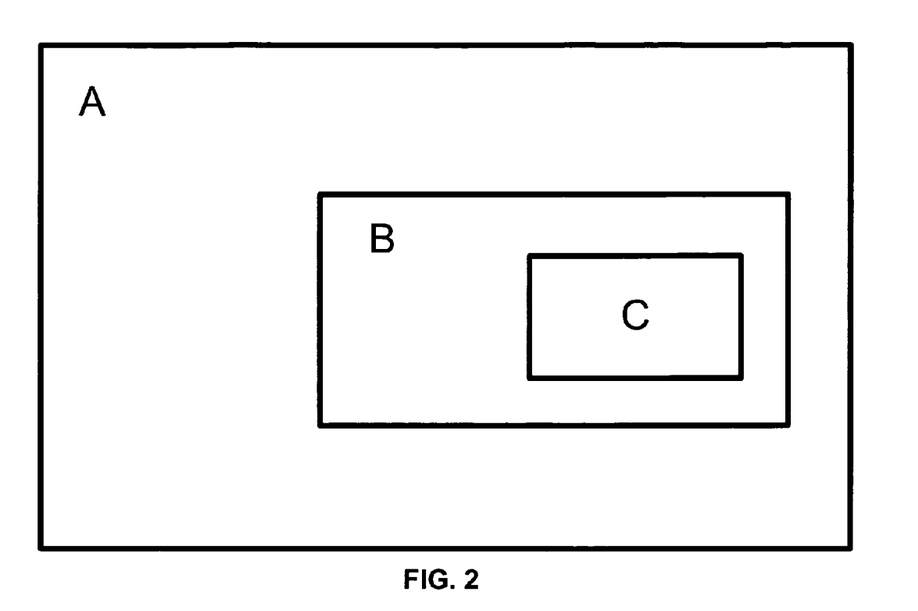
FIG. 2 shows an example of objects embedded in a web page.

FIG. 2 shows an example of embedded objects. A stored object C is embedded into a web page B, which is in turned embedded into web page A. Since C is incorporated as a static content in B when B is published and B is incorporated as a static content in A when A is published, first B and then A need to be republished when C is changed. That is, web pages with nested embedded objects in some embodiments are republished in the bottom to top order. In some embodiments, if C is changed, the change is detected and B and A are updated automatically to incorporate the current content of C as static content. In some embodiments, a table or other data structure is used as described above to determine that A and B need to be updated when C is changed.

Figure 3:
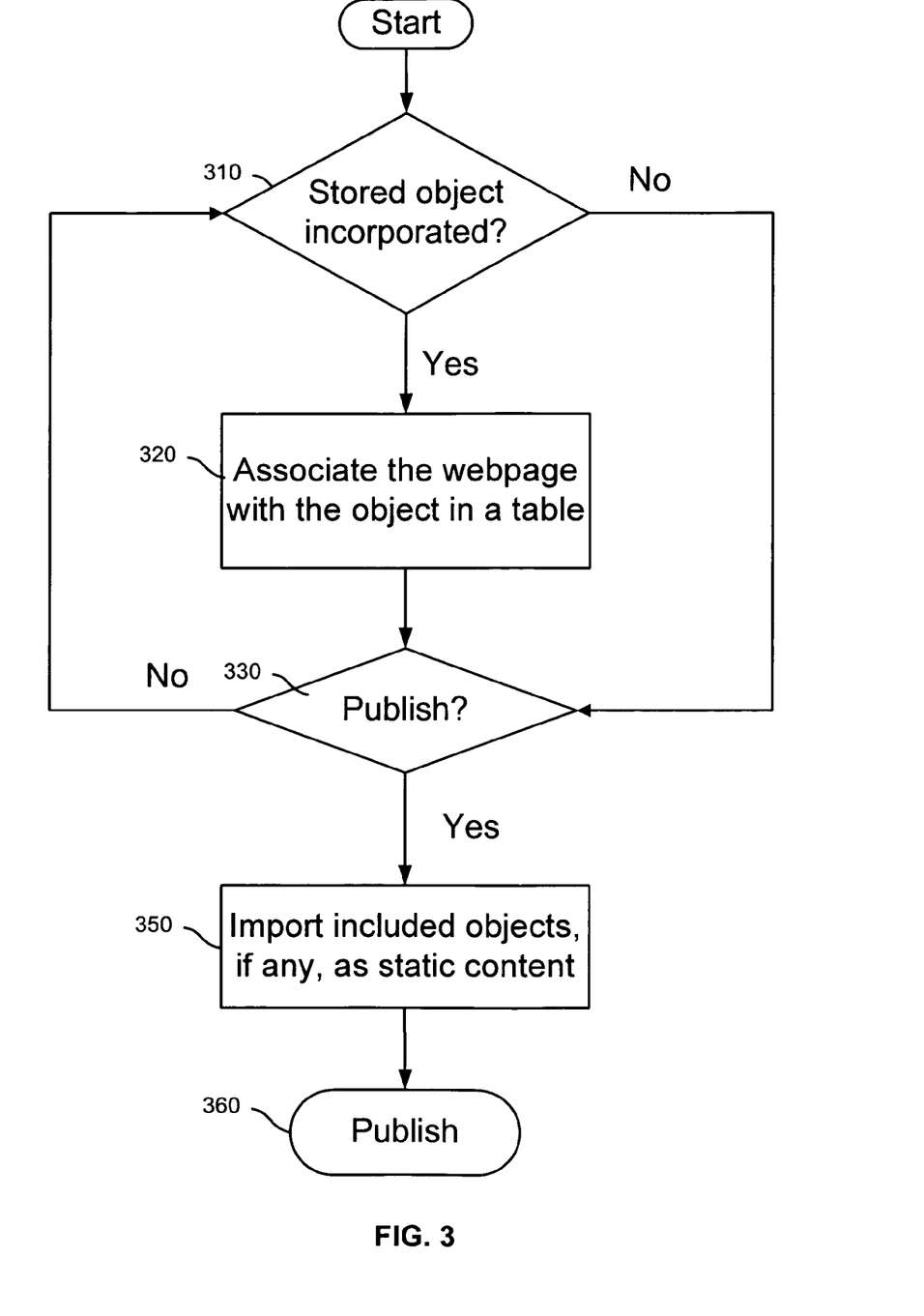
FIG. 3 is a flowchart illustrating a process used in one embodiment to incorporate a stored object.

FIG. 3 is a flowchart illustrating a process used in one embodiment to incorporate a stored object. In some embodiments, the process of FIG. 3 is implemented by a web page building application. When a user incorporates a stored object into a web page (310), the stored object is associated with the web page in a table, e.g., a table or other structure stored in a repository in which the stored object is stored (320). When the web page is published (330), the stored object is imported into the web page as a static content (350) and the web page (including the incorporated content) is published (360). Otherwise, editing of the web page continues until the web page is published (330) or in some embodiments the web page is closed without being published (not shown). In some embodiments, a web page that has not (yet) been published is stored in an intermediate format that includes a link pointing to a stored object that has been incorporated into the page. Upon publication, the link is used to retrieve and incorporate into the web page as static content a content data comprising and/or included in the stored object.

Figure 4:
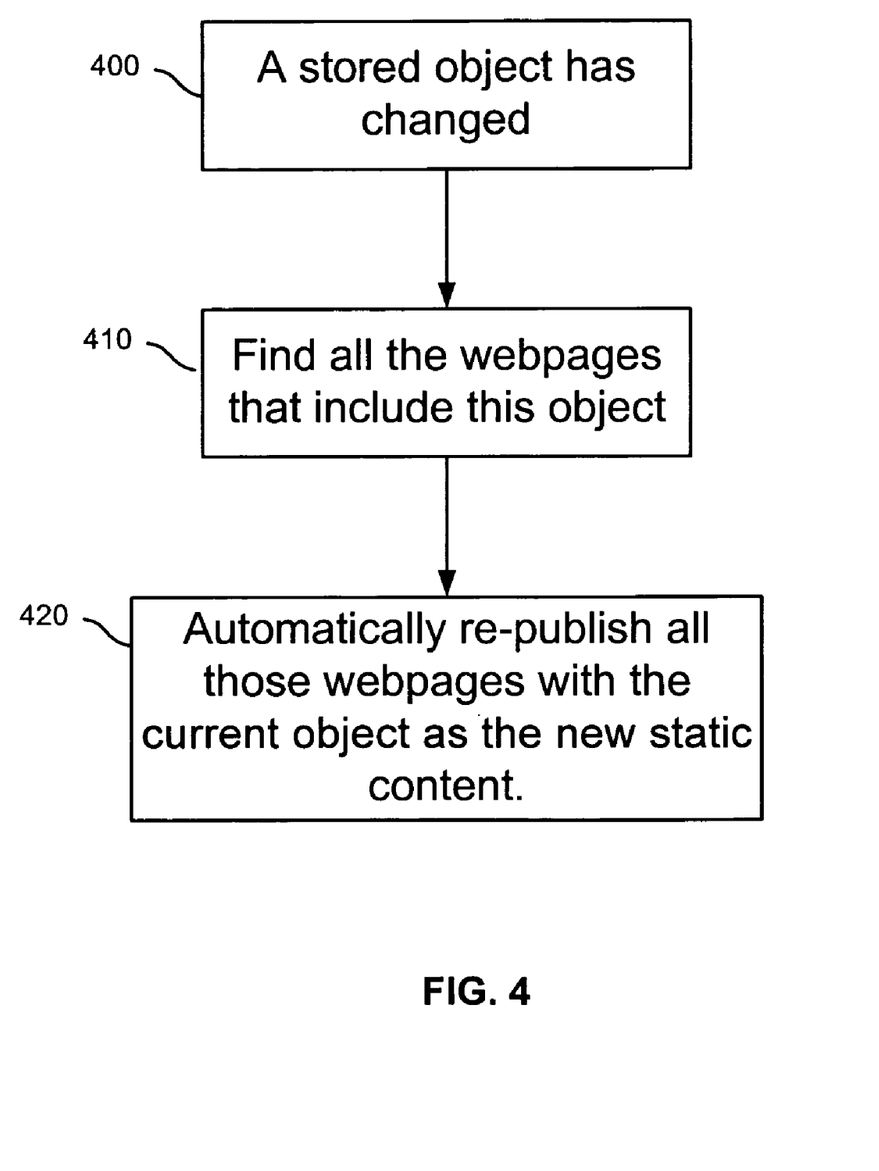
FIG. 4 is a flowchart illustrating a process used in one embodiment to update web pages when a stored object is changed.

FIG. 4 is a flowchart illustrating a process used in one embodiment to update web pages when a stored object is changed. When the change of a stored object is detected, e.g., by the repository (400), all the web pages including this object directly or indirectly are identified automatically (410). In some embodiments, 410 includes identifying all web pages into which an object into which a changed object has been incorporated, etc., as in the example shown in FIG. 2. The identified web pages are republished automatically with the current stored object as their new static content (420). In some embodiments, nested embedded pages are republished in hierarchical order from the bottom up. For example, in the example shown in FIG. 2 a change in C results in B being updated automatically, which is detected as a change in B which in turn results in A being updated automatically.

Figure 5A:
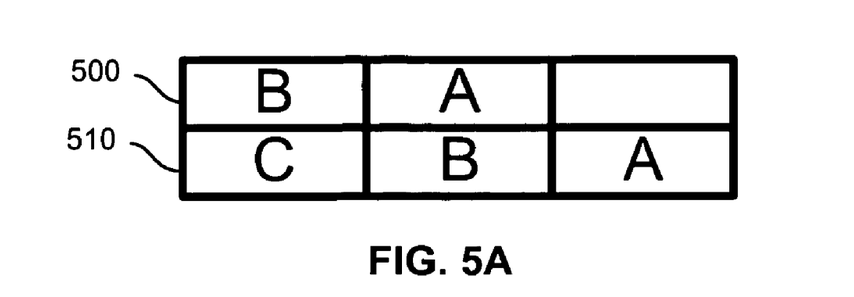
FIG. 5A shows an embodiment of associating a stored object with the web page(s) in which it is included.

FIG. 5A shows an embodiment of associating a stored object with one or more web pages into which the stored object has been incorporated. The association is demonstrated using a table format. In some embodiments, the table is implemented in a database residing in a repository in which the stored object is stored. The example shown in FIG. 5A corresponds to FIG. 2, where object C is embedded in web page B which is in turn embedded in web page A. A row 500 shows B is embedded in A, so when B is changed, row 500 will prompt the system to republish A. A row 510 shows that C is embedded in B, which is embedded in A. So if C is changed, row 510 will prompt the system to republish both B and A.

Figure 5B:
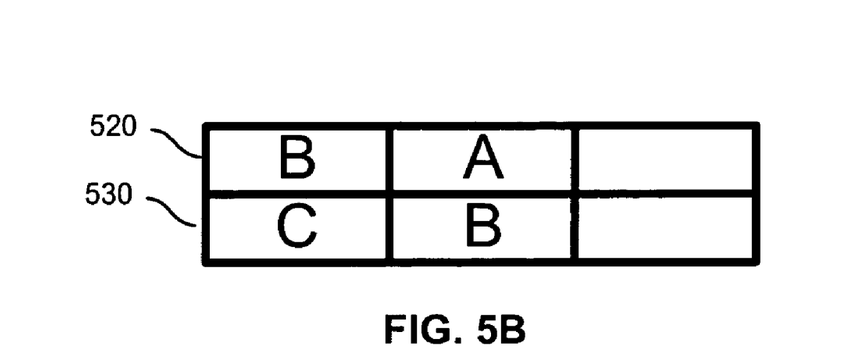
FIG. 5B shows an embodiment of associating a stored object with the web page(s) in which it is included.

FIG. 5B shows an embodiment of associating a stored object with one or more web pages into which the stored object has been incorporated. This table only shows web pages that directly incorporating an object. When object C is changed, a row 530 prompts the system to republish B as well as to check a row 520, which in turn prompts the system to republish A.

Figure 6:
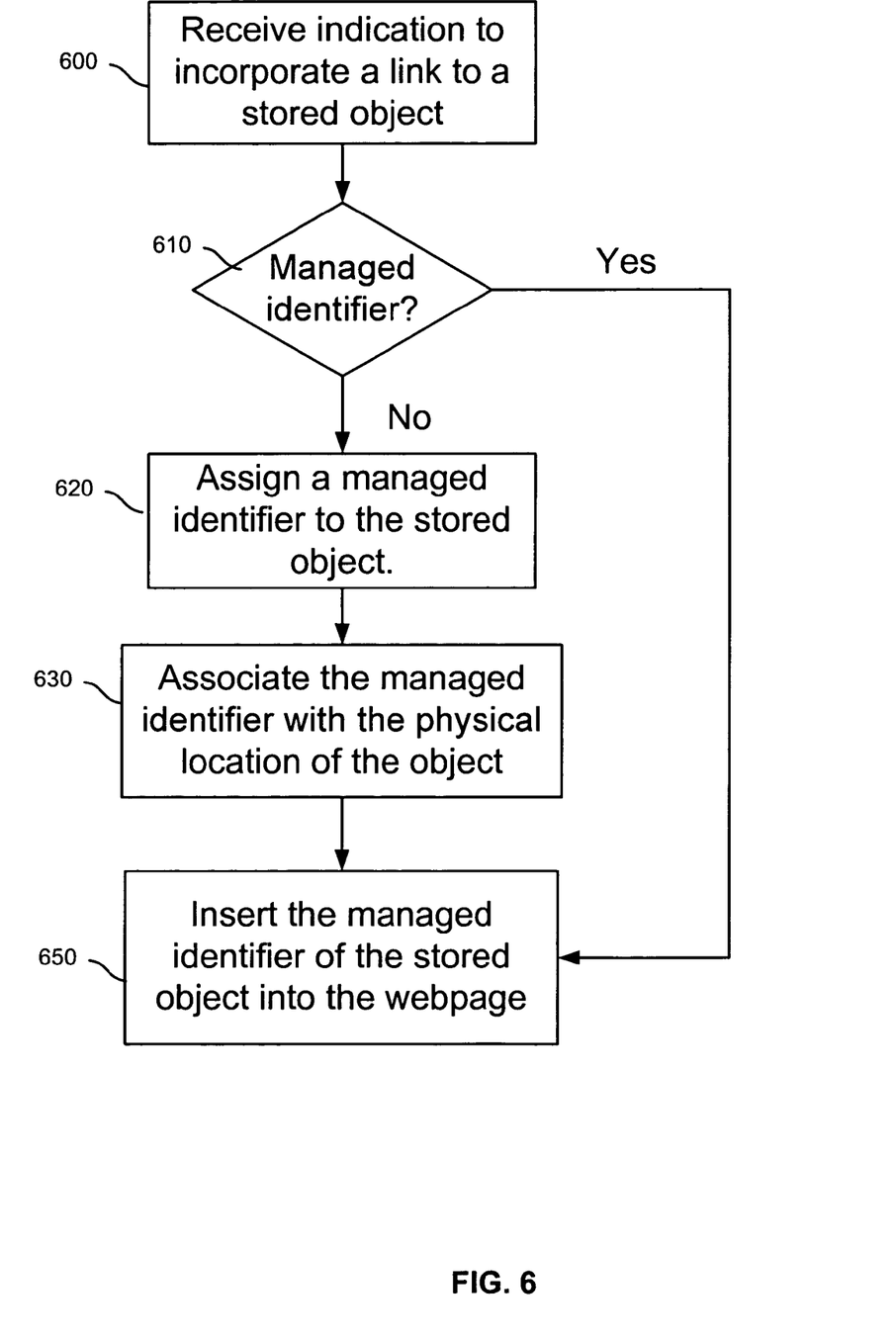
FIG. 6 is a flowchart illustrating a process used in one embodiment to assign a managed identifier.

FIG. 6 is a flowchart illustrating a process used in one embodiment to assign a managed identifier. When a user incorporates into a web page a link to a stored object (600), it is determined whether a managed identifier has already been assigned to the object (610). If not, a unique managed identifier is assigned to the stored object (620) and the managed identifier is associated with the physical location of the stored object in the repository (630). In some embodiments, the association is implemented as a table entry in the repository database. Then the managed identifier of the stored object rather than its physical location is inserted into the web page (650). If the managed identifier is already assigned (610), then the previously assigned managed identifier is inserted into the web page (650). In some embodiments, selection of the link in the web page as published results in the managed identifier being used to determine the current location of the stored object. The stored object is retrieved from the current location and served to the user who selected the link. In this way, web pages that include links to a stored object do not have to be updated if the location of the stored object changes, as would have to be done if the link comprised a URL or other locator that depends on the stored object remaining in the same location.

In some alternative embodiments, when the web page is published (650) the managed identifier is replaced by a URL or other location identifier. In such embodiments, a table or other data structure, such as described above for incorporated stored objects, is used to update web pages that include links to a stored object that has been moved to a new location.

Figure 7:
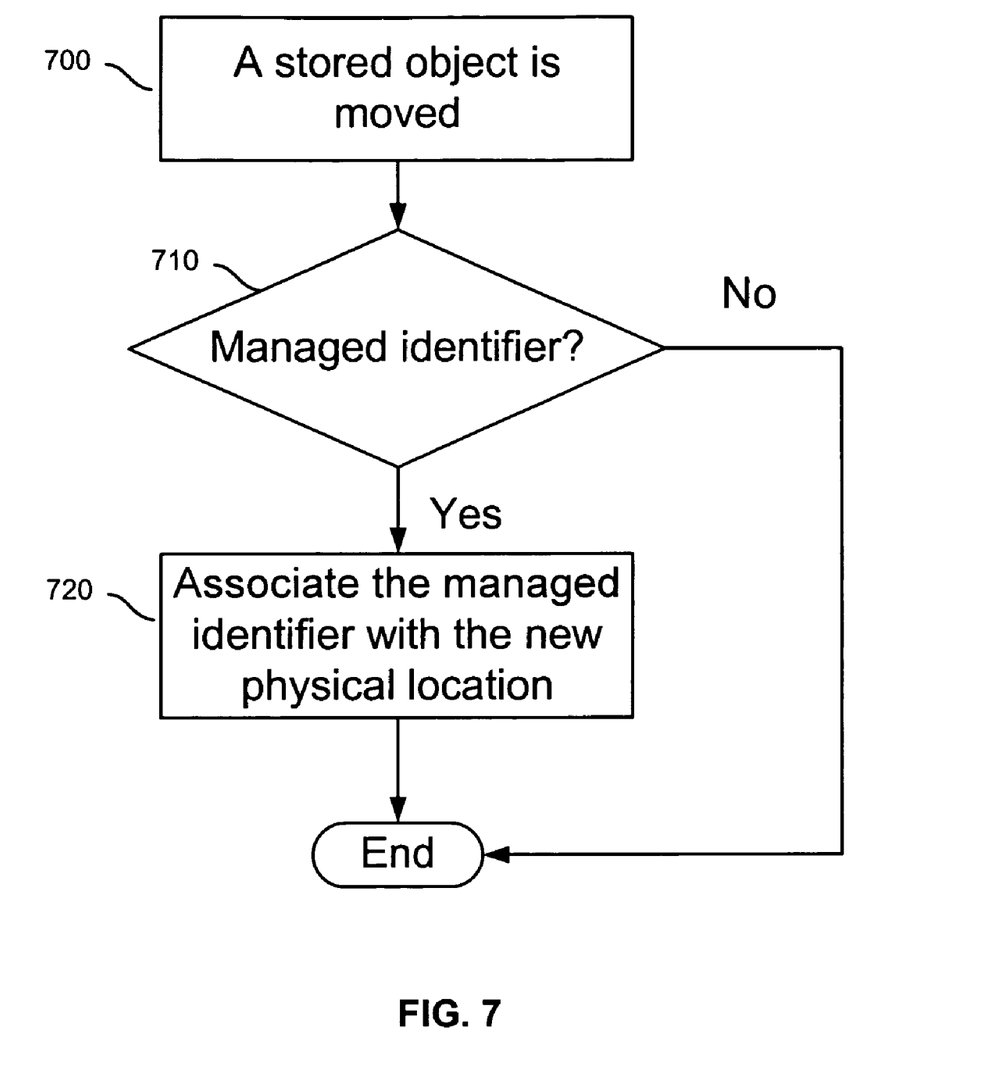
FIG. 7 illustrates an embodiment of a process to associate a managed identifier with its corresponding object when the object is moved to a new location.

FIG. 7 is a flowchart illustrating a process used in one embodiment to update an association between a managed identifier and its corresponding object when the object is moved to a new location. When a stored object is moved (700), it is determined whether a managed identifier has been assigned to the object (710), indicating the object is linked to by one or more web pages. If not, the process ends. If a managed identifier has been assigned (710), the managed identifier is associated with the new physical location (720).

In some embodiments, a change in location (700) is treated as indicating a potential change in content and web pages into which the content of the stored object has been incorporated are republished automatically, to ensure any new/modified content is included.

Figure 8A:
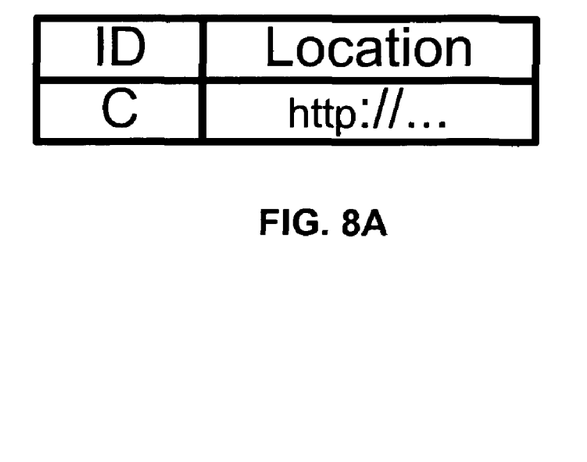
FIG. 8A shows an embodiment of associating an object with its managed identifier.

FIG. 8A shows an embodiment of associating an object with its managed identifier. In this two-column table, the left column is the managed identifier and the right column is the actual physical location of the stored object. In the example shown, the locations are specified as URL's that can be used to retrieve the stored object using the hypertext transfer protocol (http). In some embodiments, other URL's or locators, such as a content management system object id, a file system path and/or name, etc., may be used to identify the current location of a stored object that corresponds to a managed identifier.

Figure 8B:
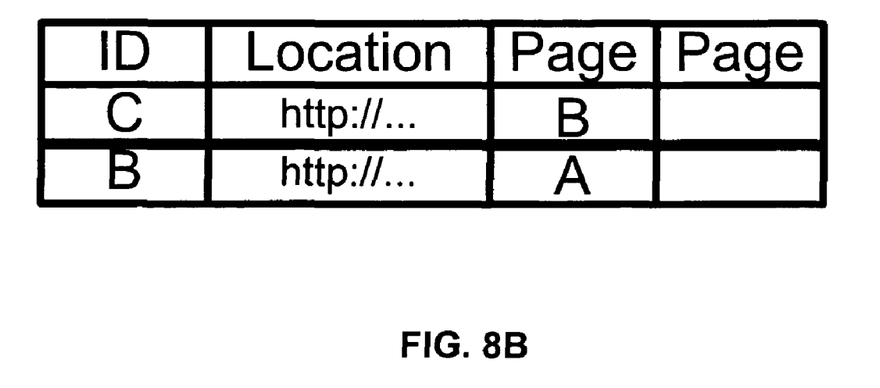
FIG. 8B shows an embodiment of associating an object with its managed identifier and any web page(s) into which the stored object has been incorporated.

FIG. 8B shows an embodiment of associating an object with its managed identifier and any web page(s) into which the stored object has been incorporated. FIG. 8B uses the scenario in FIG. 2 as an example to illustrate how the table in FIG. 5B can be combined with the table in FIG. 8A. In the first row, the first column is the managed identifier of object C, and the second column is C's physical location. The following columns are web pages or objects that either link to object C or have object C embedded in them directly. The second role is for web page B, which is similar to the first column. In a similar fashion, the table in FIG. 5A can also be combined with FIG. 8A.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of keeping incorporated web page content up to date, comprising:
    receiving an incorporation indication that a user incorporated a stored object into a web page;
    associating the web page with a structure in a repository, wherein the structure associates a specified object embedded in a specified web page with the specified web page for future lookup;
    associating the stored object with the structure;
    receiving a publishing indication that the web page is to be published;
    incorporating the stored object into the web page as a first static content;
    publishing the web page including the first static content;
    receiving a change indication that the stored object has changed to a current object;
    using a processor and the structure to automatically determine a plurality of web pages that include the stored object, wherein the plurality includes the web page;
    automatically updating the web page by incorporating the current object into the web page as a second static content to replace the first static content; and
    automatically re-publishing the plurality of web pages including the web page with the second static content.

2. A method as recited in claim 1, further comprising monitoring the stored object to detect any change to the stored object.

3. A method as recited in claim 1, further comprising determining that the stored object has been changed.

4. A method as recited in claim 1, further comprising integrating with the repository to detect changes to the stored object.

5. A method as recited in claim 1, further comprising creating and maintaining a table as the structure, wherein the table comprises data that associates stored objects with web pages that include said stored objects.

6. A method as recited in claim 5, wherein the table is stored in the repository in which the stored objects are stored.

7. A method as recited in claim 1, wherein the stored object that has been incorporated is a link to another web page.

8. A method as recited in claim 1, further comprising integrating with the repository, wherein the repository tracks where the stored object is stored and provides an indication when the stored object is moved.

9. A method as recited in claim 5, wherein the table in addition maps the stored object to one or more web pages into which a content comprising the stored object has been incorporated.

10. A computer system, comprising:
    a processor configured to
    receive an incorporation indication that a user incorporated a stored object into a web page;
    associate the web page with a structure in a repository, wherein the structure associates a specified object embedded in a specified web page with the specified web page for future lookup;
    associate the stored object with the structure;
    receive a publishing indication that the web page is to be published;
    incorporate the stored object into the web page as a first static content;
    publish the web page including the first static content;
    receive a change indication that the stored object has changed to a current object;
    use the structure to automatically determine a plurality of web pages that include the stored object, wherein the plurality includes the web page; and
    automatically re-publish the plurality of web pages including the web page with the second static content; and
    a storage configured to store the stored object.

11. A computer program product for keeping incorporated web page content up to date, the computer program product being embodied in a computer readable storage medium and comprising computer instructions for:

receiving an incorporation indication that user incorporated a stored object into a web page;

associating the web page with a structure in a repository, wherein the structure associates a specified object embedded in a specified web page with the specified web page for future lookup;

associating the stored object with the structure;

receiving a publishing indication that the web page is to be published;

incorporating the stored object into the web page as a first static content;

publishing the web page including the first static content;

receiving a change indication that the stored object has changed to a current object;

using the structure to automatically determine a plurality of web pages that include the stored object, wherein the plurality includes the web page;

automatically updating the web page by incorporating the current object into the web page as a second static content to replace the first static content; and automatically re-publishing the plurality of web pages including the web page with the second static content.

12. A system as recited in claim 10, wherein the repository is stored in the storage.

* * * * *